July 22, 1947.  R. L. SNYDER, JR., ET AL  2,424,289

CALCULATING DEVICE

Filed July 30, 1943  8 Sheets-Sheet 1

Inventors
Richard L. Snyder Jr.,
Jan A. Rajchman
By
C. D. Tuska
Attorney

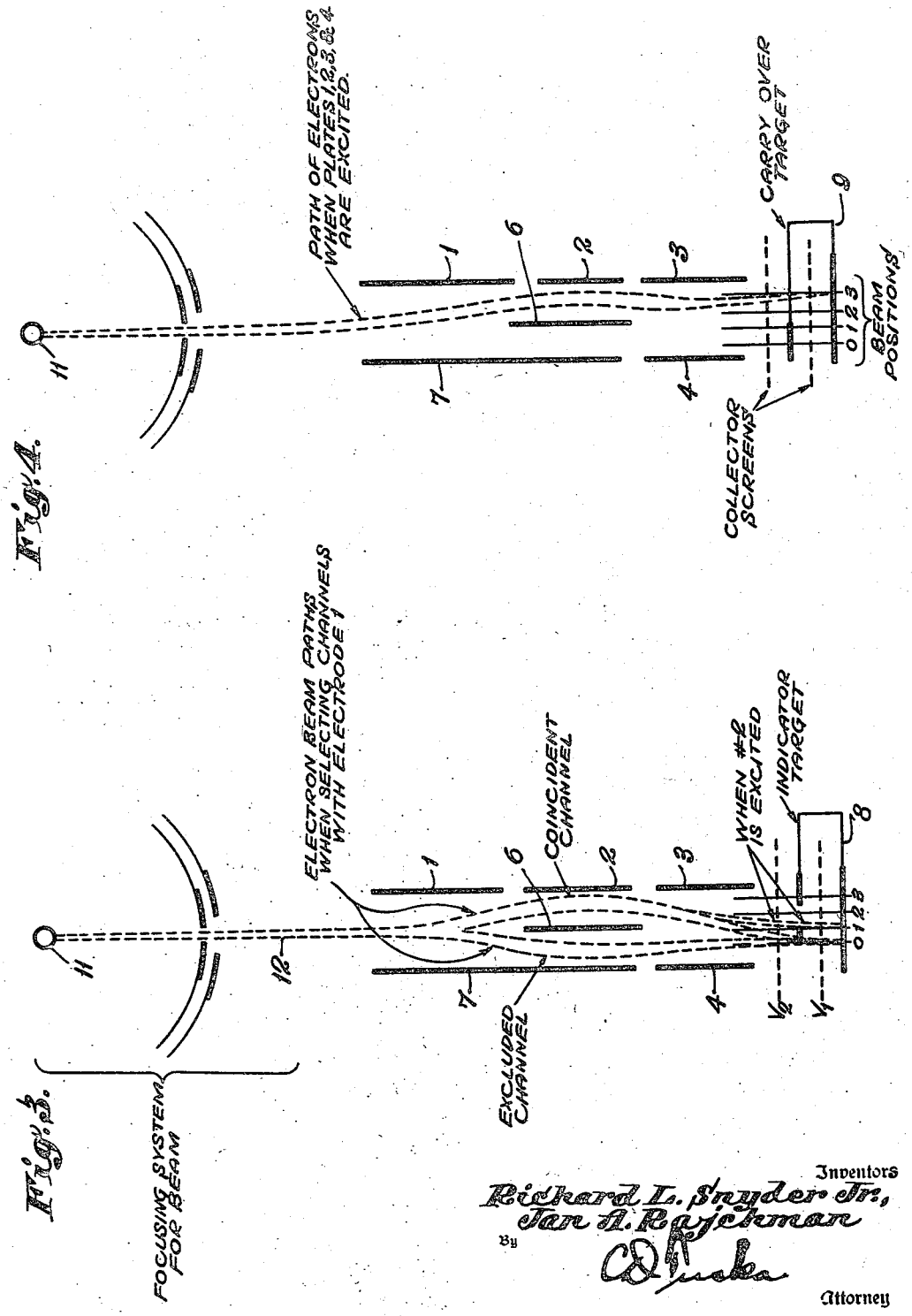

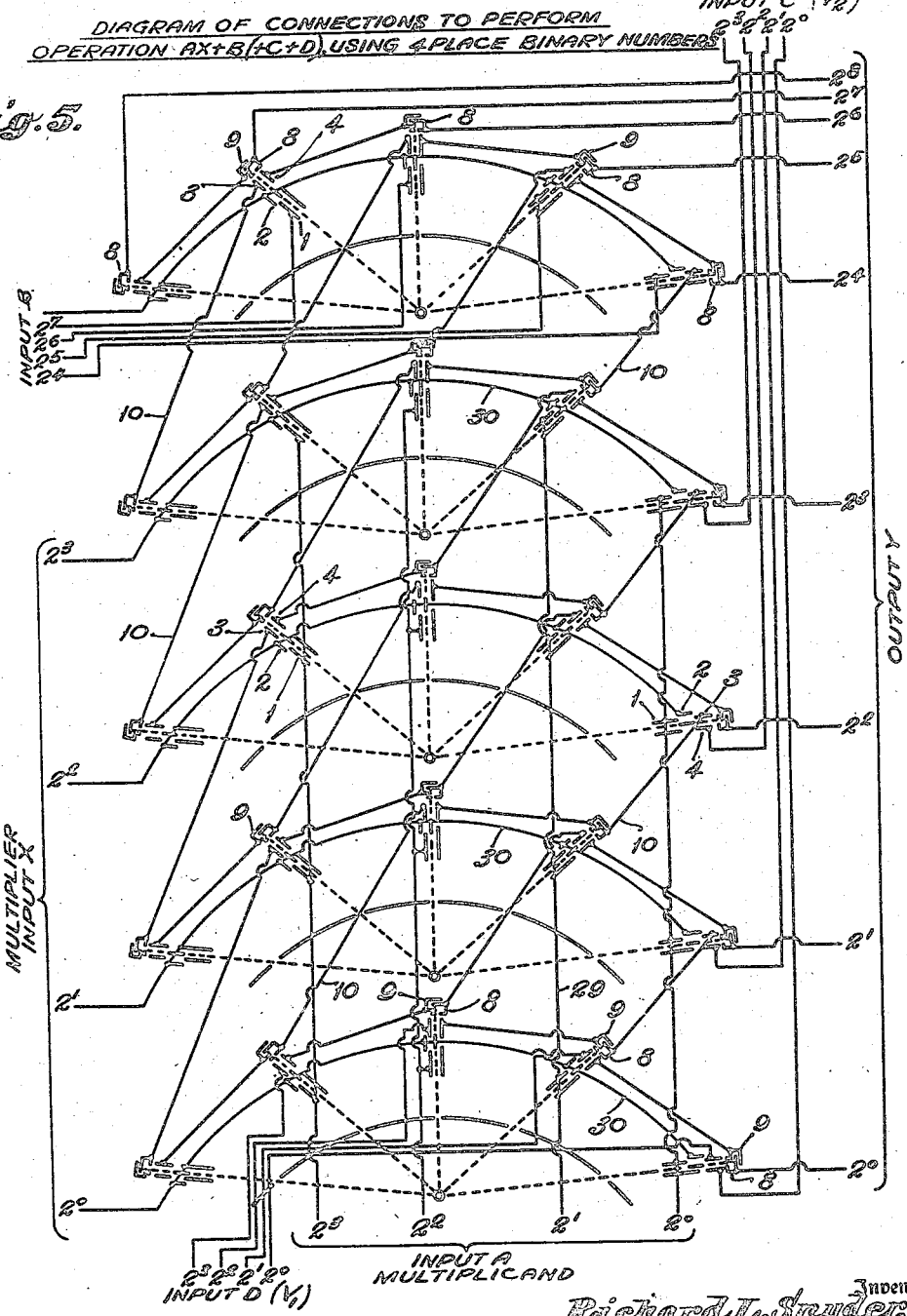

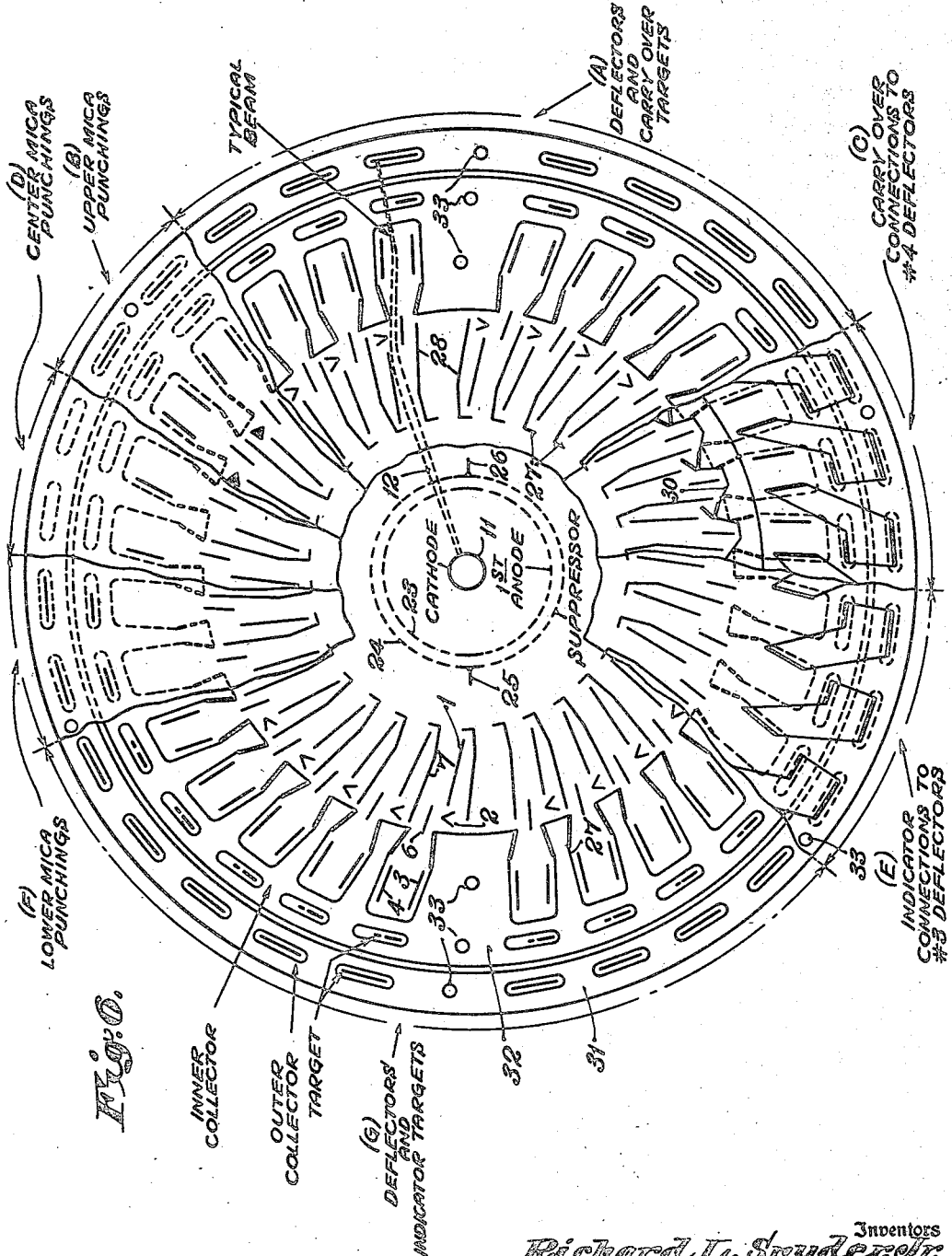

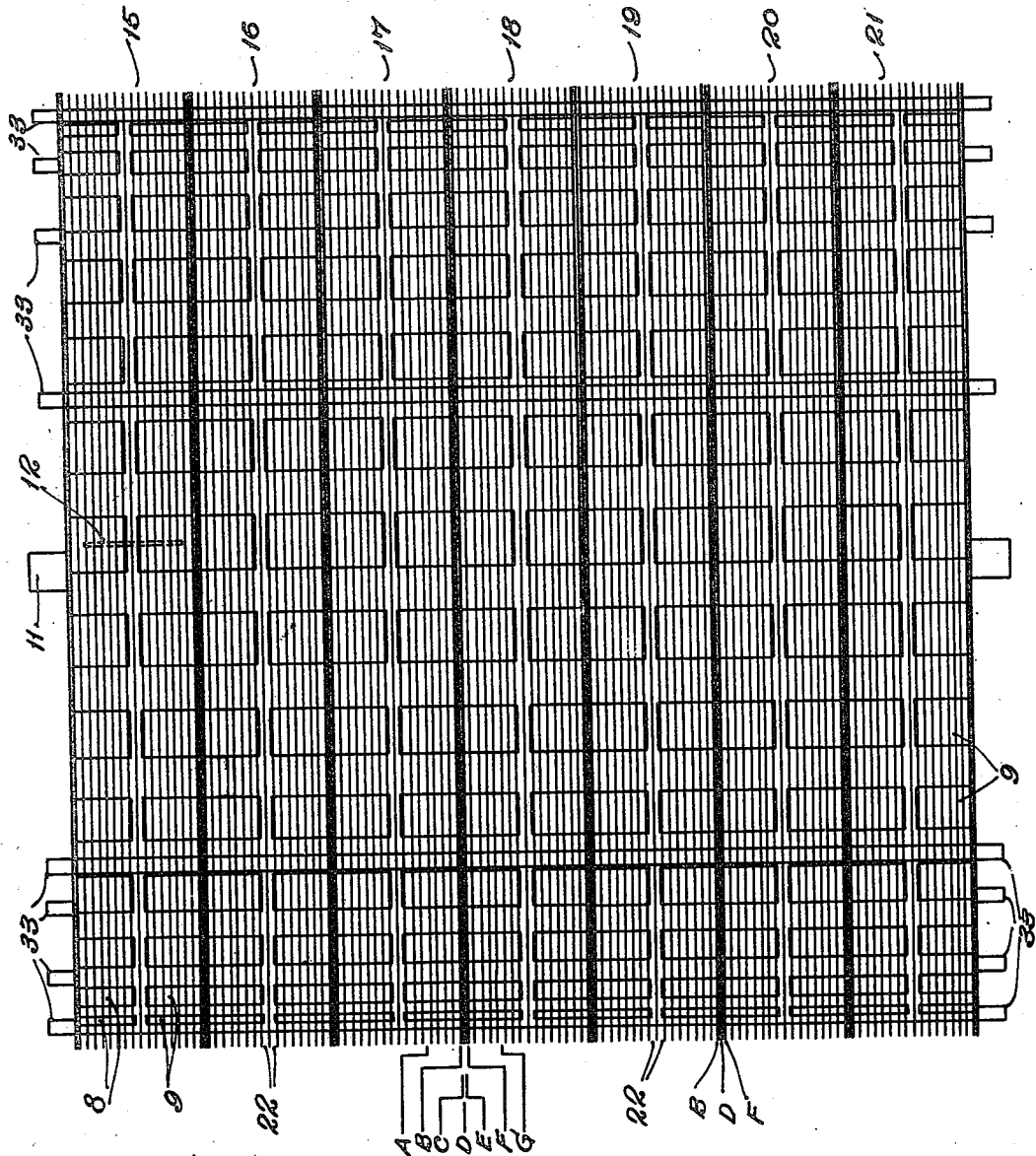

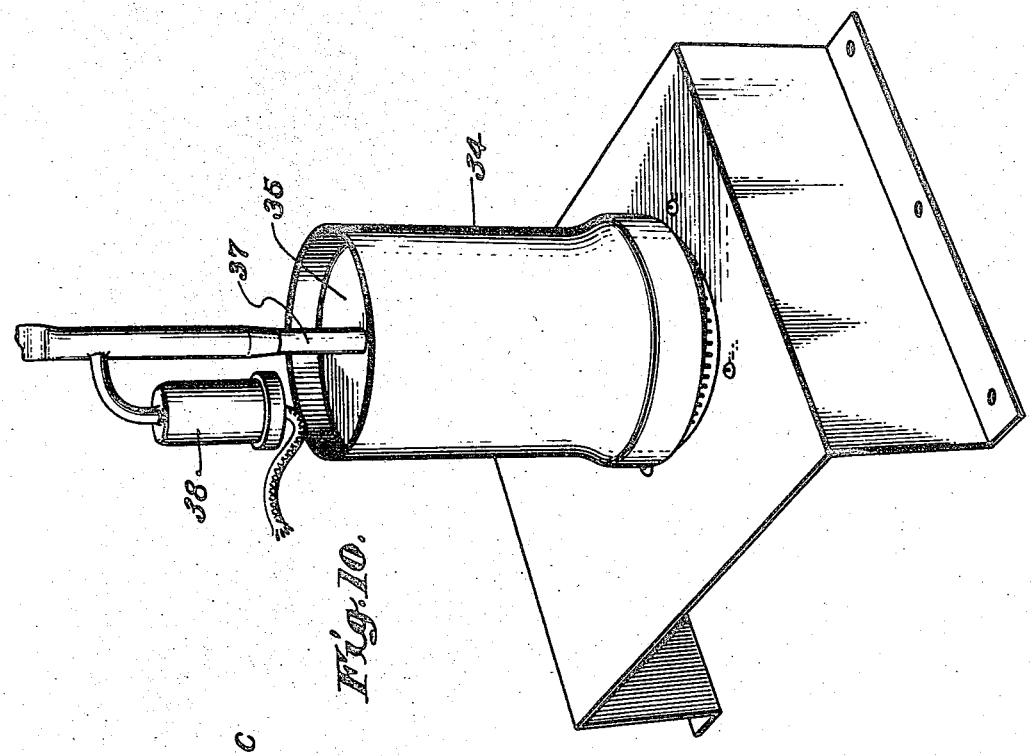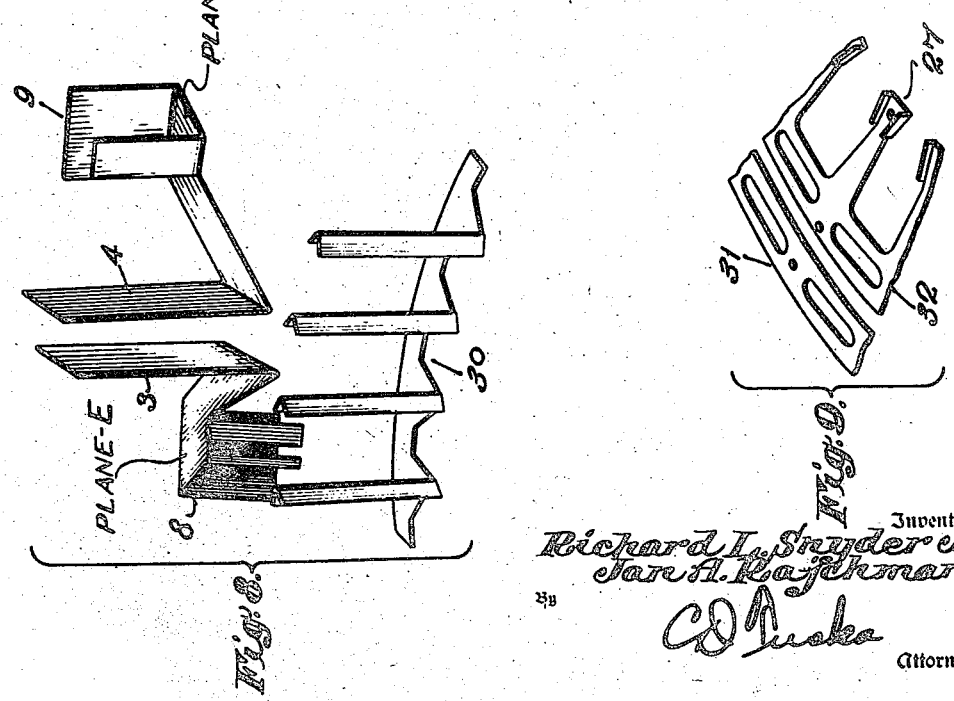

July 22, 1947.  R. L. SNYDER, JR., ET AL  2,424,289
CALCULATING DEVICE
Filed July 30, 1943  8 Sheets-Sheet 7

Inventors
Richard L. Snyder Jr.,
Jan A. Rajchman
By
C. D. Tuska
Attorney

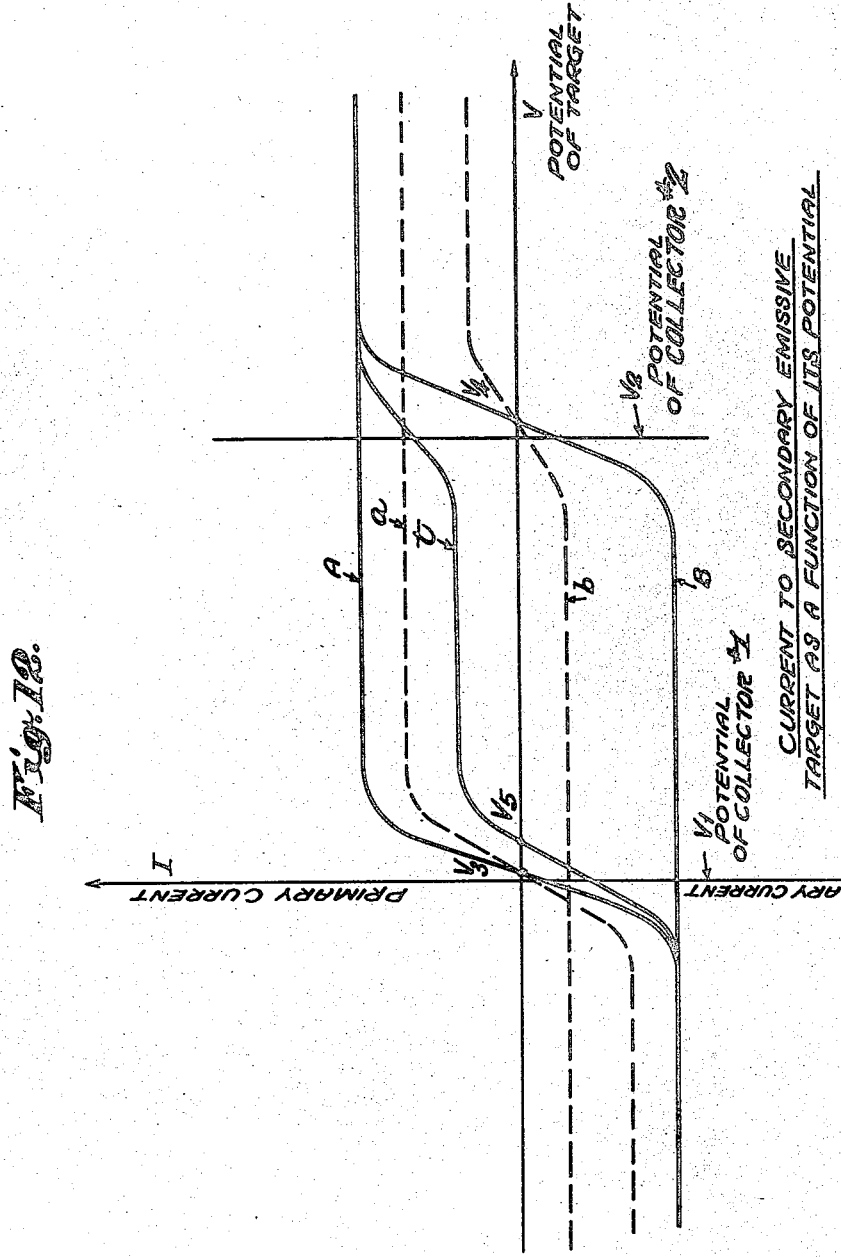

Patented July 22, 1947

2,424,289

UNITED STATES PATENT OFFICE 2,424,289

CALCULATING DEVICE

Richard L. Snyder, Jr., and Jan A. Rajchman, Princeton, N. J., assignors to Radio Corporation of America, a corporation of Delaware Application July 30, 1943, Serial No. 496,746

36 Claims. (Cl. 235—61)

This invention relates to calculating or computing devices such as those utilized to add or multiply a series of numbers. It has for its principal object the provision of an improved calculating device wherein a plurality of cathode ray or electron beams are so controlled that the path of each is determined by digits of the numbers to be added to or multiplied. In its illustrated form, it involves, among other features, means for forming a plurality of ribbon-like cathode ray beams which are located in layers one above the other, the beams in each layer being disposed equi-angularly about the axis of the device. It also involves deflecting electrodes arranged to control the position of each beam in accordance with the particular number which it represents and a series of indicator and carry-over targets by which the various subtotals are accumulated so as to provide an indication of the result at the output terminals of the device.

The device was originated in connection with the development of a numerical computer for anti-aircraft fire control. It consists of a special electron tube which functions to perform the addition and multiplication of numbers given in terms of systems of electric potentials.

Any required degree of accuracy can be obtained with the numerical method of computation merely by using the proper number of digits. Therefore, the accuracy of one part in 10,000 needed in the computer with the present day optical or radar tracking instruments for the present day medium and long range guns can be achieved and easily exceeded. Thus, full advantage may be taken of future improvements in tracking instruments and guns. Furthermore, the great speed which is inherent in electronic devices makes it possible to perform the numerous complicated computations without setting any limit on the firing speed of the gun. Such accuracy and speed are obviously of great importance in the control of many industrial processes of many different types.

An important object of the invention is to provide an improved apparatus and method of operation whereby numbers may be added or multiplied quickly and without the complication of timing impulses, clearing impulses or the like.

Another object is to provide an improved electronic calculating device which may be directly connected to the output or input of another such device without the use of coupling resistors, coupling amplifiers or the like.

A further object is to provide an electronic calculating device having most of its interconnecting network located within an evacuated container and having a minimum number of leads extending through the wall of such container.

Among other objects are to provide an improved electronic calculating device which is operable to determine the product of two different numbers and to add to this product another number; to provide an electron gun and deflecting system which are capable of establishing coincident and excluded paths for the electron beam; to provide an improved commutator structure whereby different predetermined potentials may be established on the same floating target and to provide an interconnecting network whereby potentials representing the digits of the sum and product are made available on leads maintained at potentials of the same order as those of the terms or factors.

The invention will be better understood from the following description considered in connection with the accompanying drawings and its scope is pointed out in the appended claims.

Referring to the drawings:

Figs. 3 and 4 are explanatory diagrams illustrating the arrangement and operation of the various electrodes and targets which constitute one of the electron guns of the device.

Fig. 5 is a wiring diagram showing the connections between the various electrodes and targets of the different electron guns of the device.

Fig. 6 shows partial cross sections of the device at various levels indicated by the letters A, B, C, D, E, F and G, the particular elements exposed by the various partial cross sections being indicated by suitable legends.

Fig. 7 illustrates the electron gun arrangement and other structural features of the device.

Fig. 8 shows the structure of the indicator and carry over targets together with that of the multiplier and multiplicand electrodes.

Fig. 9 illustrates the construction and arrangement of the inner and outer collectors whereby the indicator and carry over targets are shielded and the deflection of the electron beam is partly controlled.

Figs. 10 and 11 show a construction suitable for the evacuated envelope of the device; Fig. 12 is an explanatory diagram relating to the functioning of the targets of the device.

Figure 1:
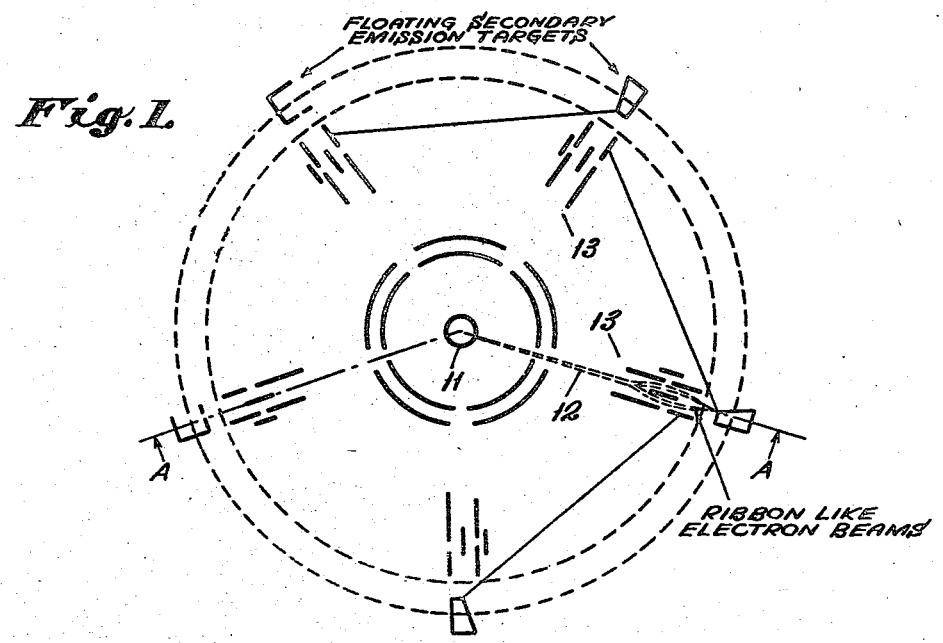
Figs. 1 and 2 are explanatory diagrams of transverse and axial cross sections illustrating various features of the device.

The whole computation is made in the "binary,"

"dyadic," or "scale-of-two" system of numeration, a system employing a radix of two, so that any number is expressed as a sum of powers of two in which the coefficients of the terms are zero or one, the only two digits of the system. This system was chosen because most electronic computations are performed more easily in it than in the usual decimal system or any other, and because the equipment involves the least number of signal channels, as long as each channel is restricted to only two signals (e. g. "on" and "off"). This choice does not introduce any practical difficulty due to the unusual method of expressing numbers, since both the input and output of the computer are converted by automatic devices and they never have to be "ciphered" or "deciphered" by an operator.

Furthermore, the operation is made by the so-called "direct method." Here a binary number is expressed by a system of as many potentials as there are binary digits in it, each potential having one of two definite values corresponding respectively to the digits zero and one. All these potentials exist simultaneously on a system of conductors each carrying a potential corresponding to one digit of the number. Two or more such systems of potentials are combined in a computing device and the output is a new system of potentials. The result of the computation is the stationary value of these output potentials and depends only on the stationary value of the input potentials, regardless of the manner in which they were reached. A sudden change in one or more input digits will, after short transients, cause the output potentials to reach their correct stationary values, so that the operation of the direct computing device may be considered as "continuous." It does not involve any trigger elements with inherently stable states, or any "holding" devices, nor does it necessitate any definite sequence, timing or clearing pulses. Therefore, it is not a counter of any type and it does not involve any impulses. It is basically the fastest type of numerical device, since no time is wasted in the sequencing of operations. It is also the simplest for connecting the many computing elements of an anti-aircraft fire control computer to one another since this can be done without any consideration of timing pulses, switching and clearing which would be involved with an impulse-counting system of numerical computation.

The function of the improved electronic computing device tube is to add and multiply binary numbers by the direct method; that is to say, it is to transform given systems of potentials each having one of only two possible values representing the terms or factors into a new system representing the sum or product. This is achieved by properly deflecting a multiplicity of electron beams emanating from a single cathode, utilizing the positions of the beams to bring the potential of floating secondary emissive targets to one of two potential equilibria and establishing proper internal connections between the targets bombarded by a given beam and the deflectors controlling another beam.

The principle of the operation of the device can be more easily explained with the help of a degression into the arithmetic of the binary numeration. Any number A is expressed as the sum of integral powers of two such as:

$$A = a_n 2^n + a_{n-1} 2^{n+1} \ldots + a_k 2^k + \ldots + a_0$$

where the coefficients $a_k$ are either one or zero. The numbers can be written in the usual digital representation as shown for the first 17 numbers on the following table:

| 0 | 0 |
|---|---|
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |
| 16 | 10000 |

For any number the first digit from the right, or first "digital position," signifies whether there is a $1=2^0$ in the number or not, the second digital place whether there is a $2=2^1$ or not, the third whether there is a $4=2^2$ or not, the fourth whether there is an $8=2^3$ or not, etc.

An addition of two numbers $A=10111$ and $B=10110$ ($A=23$ and $B=22$ in the decimal numeration) can be made as is done in the usual elementary arithmetic:

```
   1 11        carry over
  10111          A          23
  10110          B         +22
  ------                    --
 101101         A+B         45
```

This addition proceeds by adding successively the digits of A and B of the same digital position from right to left, taking into account the "carry over" number which results when the sum of the digits in any digital position is equal to two or more. Thus in the example above, the operations can be followed by starting from the right and saying successively: one and zero equal one, write one; one and one equal two, write zero, and carry over one; one, one and one equal three, write one and carry over one; one zero and zero equal one, write one; etc.

The multiplication can also be made by a similar elementary arithmetical operation. For example $A=1110$ times $x=1011$ (or $A=14$, $x=11$ and $Ax=154$ in the decimal numeration) can be performed as follows:

```
      1110      A   Multiplicand
   ×  1011      x   Multiplier
      ----
      1110
     1110
    0000
   1110
   --------
   10011010    Ax   Product
```

Each horizontal line is simply the multiplicand A multiplied by the appropriate digit of the multiplier $x$ and properly displaced to the left, so that all the corresponding digital places are on the same vertical lines. The addition of the four numbers is made as explained above, only the carry over number may exceed one since more than two numbers are added.

In the present device the multiplication is performed by successive partial additions instead of one all-inclusive addition, as this is found to be more suitable for electronic computation. The successive operations can be arranged as illustrated below:

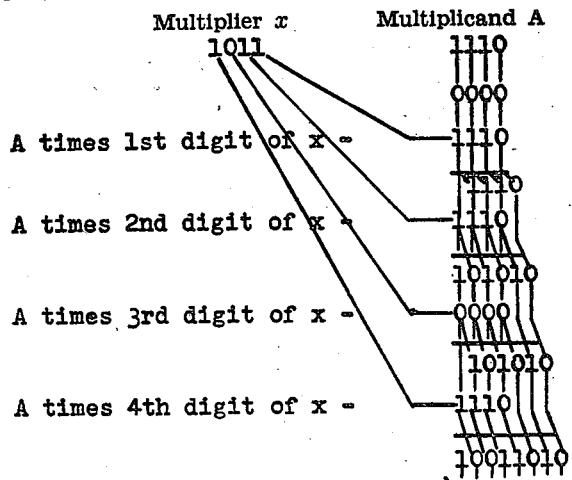

The first addition of zero, which may be considered as a first sub-total, plus the multiplicand times the first digit (from the right) of the multiplier, is somewhat trivial and is made only for the sake of uniformity. The result of this addition, which is the second subtotal, is displaced to the right by one digital place and the multiplicand times the second digit of the multiplier is added to it to obtain the third subtotal. This subtotal is shifted to the right, etc. The last subtotal is, of course, the product sought. In this case, the subtotals are shifted to the right instead of shifting the multiplicand to the left, as in the usual method, obviously with the same effect.

Therefore, the multiplication is reduced to as many additions of two numbers, as there are digital place in the multiplier (four in the example above). The two numbers are the last subtotal and the multiplicand or zero, depending on the value of the corresponding digit of the multiplier. Since only two numbers are added there can be only a "one" as the carry over number from one place to another, as can be seen for instance by analyzing one typical digital position of the addition which leads to the 3rd subtotal of the example.

In a given digital position there are, in general, a carry over number from the preceding digital position which can be zero or one, a digit from the last subtotal, which can also be zero or one, and a digit of the multiplicand which is one only when the digits of the multiplicand and multiplier corresponding to the digital place are both one. Therefore, the sums of these three digits can be zero, one, two or three and it must be recorded in terms of an "indicator" digit for the next subtotal and a "carry over" digit for the next digital place. These indicator and carry over digits will have values according to the following table, depending upon the value of the significant sum S.

| Sum S | Carry Over Digit | Indicator Digit | Sum S in notation of binary numeration |
|---|---|---|---|
| 0 | 0 | 0 | 0 |
| 1 | 0 | 1 | 1 |
| 2 | 1 | 0 | 10 |
| 3 | 1 | 1 | 11 |

It is apparent that the indicator and carry over digits correspond respectively to the first and second digits of the number S as written in the notation of the binary numeration.

It follows from the above that the key to the complete multiplication is the summation of the partial digital sum S and the expression of it in terms of the binary numeration, since the "carry over" and "indicator" digits of any sum S are the terms in succeeding digital summations of the same type. Therefore, the whole multiplication may be considered merely as a repetition of this process. Assuming the multiplicand and the multiplier to have $p$ digital places each, this elementary process of the summation and binary expression of the sum S, will occur in all $p(p+1)$ times, since each subtotal involves $(p+1)$ such processes and there are in all $p$ subtotals. Therefore, a relatively small number, $p(p+1)$, of devices capable of physically accomplishing this key process can be made to perform the complete multiplication. This is precisely what is accom-

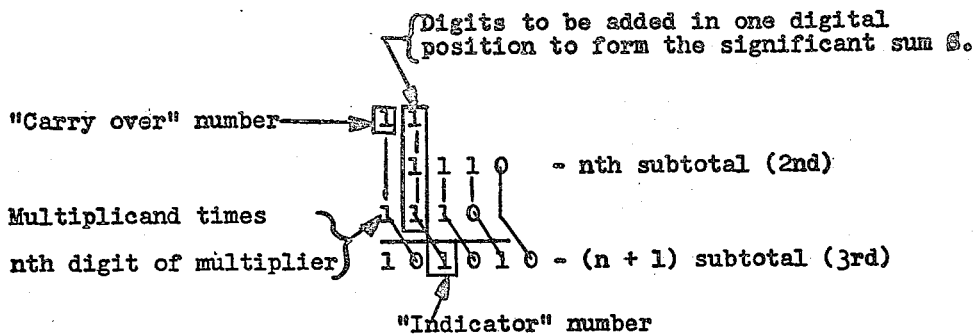

plished by the improved electronic calculating device.

One suitable form of this improved calculating device has a single long cylindrical cathode 11 from which emanate radially a number of ribbon-like electron beams 12, arranged in $p$ parallel layers along the cathode each containing $(p+1)$ beams emanating radially and equiangularly around the cathode. (See Figs. 1 and 2 which are plan and elevation sections of the device and in which $p=4$.) Each beam serves as elementary cell 13 which accomplishes a single key process of summation and binary expression of the digital sum S. The summation is essentially accomplished by adding proper deflections of beams; the binary signals corresponding to the carry over and indicator digits are obtained from targets bombarded by the beams as hereinafter explained.

The operation of an elementary cell 13 can be seen with the help of Figs. 3 and 4. The potentials representing the multiplicand and multiplier are carried by conductors sealed through the envelope of the tube and are applied to deflecting plates No. 1 and No. 2 of the elementary cells. In any given cell, plate No. 1 is connected to the conductor of the multiplicand digit corresponding to the particular digital summation S accomplished by that cell, and plate No. 2, to the conductor of the multiplier digit corresponding to that summation. It will be recalled that the potentials representing the binary numbers can have either of two values $V_1$ or $V_2$ corresponding to the digits zero and one, so that plates No. 1 and No. 2 may be considered to be either excited by the "digital voltage step" $V=V_2-V_1$, or not, depending upon whether the particular digit is one or zero. The "indicator" signal resulting from the digit of the last subtotal (to which the multiplicand is being added) is applied to the subtotal deflecting plate No. 3 and the "carry over" signal obtained from the preceding digital summation (of the same subtotal addition) is applied to carry over deflecting plate No. 4. These latter signals are obtained as the potentials of the properly bombarded targets in other cells, as will be apparent from the following.

The geometrical configuration and the potentials of the various electrodes are such that, if plate No. 1 is not excited (i. e. at the more negative potential $V_1$) the beam passes between plates No. 6 and No. 7, on the left of plate No. 6 on Fig. 3, and bombards the targets at position No. 0, provided that plates No. 3 and No. 4 are not excited. In that left channel the beam is not affected by the potential of electrode No. 2 since it is shielded from its influence by the "island" electrode No. 6. Therefore, it strikes the targets at position No. 0 whether plate No. 2 is energized or not. Now, if plate No. 1 is excited (i. e. at the more positive potential $V_2$), the beam will flow between electrodes No. 6 and No. 2, on the right of the island. In virtue of proper geometrical configuration and potentials of the electrodes, the beam will still strike the targets at position No. 0, provided that plate No. 2 is not excited. Therefore, the excitation of plate No. 1 by itself results is no net deflection of the beam on the target but merely by a change in paths—from "excluded" (left) to the "coincident" (right) channel—to arrive at the same point. Now, if electrodes No. 1 and No. 2 are both excited, there will be a net deflection of the beam because the beam will be under the influence of the field created by the potential of electrode No. 2 in the coincident channel. That net deflection is one unit step on the targets and corresponds to the digit of the digital sum S contributed by the multiplicand. It is apparent that that digit will be one only if both the digit of the multiplicand of that particular digital position and the digit of the multiplier of that particular subtotal addition are both one, as is required by the above arithmetical considerations. This system of deflecting plates, No. 1, No. 2 and No. 6 can be called a "coincident" (or an "excluding") deflecting system, since it produces a net deflection of the beam only if there is a coincidence of excitations. It performs a real multiplication since it produces in effect the four results: zero times zero equal zero, zero times one equal zero, one times zero equal zero, and one times one equal one, which are the four products possible in the simple digital multiplication table of the binary numeration. This table is indeed reducible to a coincidence effect since the product of the digits is one only when both terms are one, and zero for any other case.

The excitation of plate No. 3 or No. 4 with the unit digital voltage step V, produces a net deflection of the beam equal to the unit step, as did electrode No. 2. By inverting the polarity of excitation on plate No. 4 (i. e. there is excitation when that plate is at the more negative potential $V_1$) it is apparent that the net deflections due to plates No. 3, No. 4 and No. 1, No. 2 are additive, so that the beam can strike the target at positions 0, 1, 2, or 3 depending upon the combination of excitations. The beam will therefore assume a position whose number is equal to the partial sum S, since plate No. 1 is controlled by the proper multiplicand digit, plate No. 2 by the proper multiplier digit, plate No. 3 by the proper indicator digit and plate No. 4 by the proper carry over digit. The beam will strike the correct position on the targets because electrostatic deflections are essentially additive.

Figure 2:
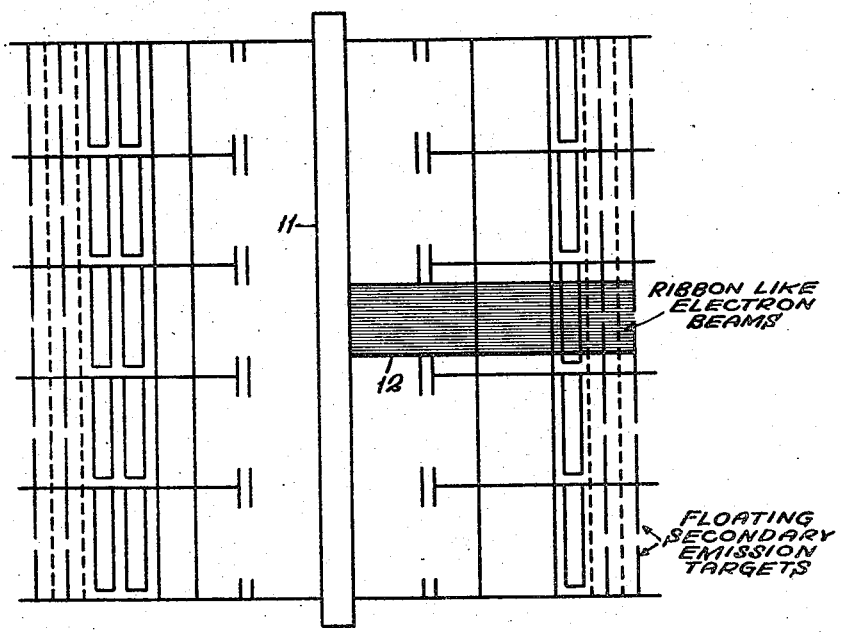

The indicator and carry over signals, corresponding to the binary digits of the sum S, are obtained as the equilibrium potentials reached by floating targets 8 and 9 which are bombarded by the beam. The indicator and carry over targets are located one above the other and share the current of the beam. These targets are shown on Figures 3 and 4, which are cross-sections of the same elementary cell at different levels (as shown in Figure 2, section $a-a$). These targets 8 and 9 are floating, that is to say, they are insulated from all other electrodes in the tube, and their surface is capable of secondary electron emission in excess of primary bombardments at the bombarding voltages $V_1$ and $V_2$. It is well known and is hereinafter explained in connection with Fig. 12 that a floating secondary emissive target of this sort will assume the potential of the electrode collecting the secondaries, within a few volts. This property which is utilized in iconoscopes, kinescopes, etc., depends on the fact that the potential of the target must be such that the secondary emission equals exactly the primary bombardment; a condition possible only if part of the available secondary emission is suppressed by a slightly negative field at the surface of the target. The target can reach two (or more) different potential equilibria if the beam strikes it in regions facing collectors maintained at two (or more) different potentials. For instance in Figure 3 the indicator target is composed of two parts facing respectively two screen-like collectors maintained at the potentials $V_1$ and $V_2$. If the beam strikes the target at position No. 0, it will reach the back part of the target and bring the whole target to potential $V_1$. At position No. 1, it will strike the front part and force the potential of the whole target to be $V_2$. At position No. 2, it will strike the back again so that the target will again assume the potential $V_1$. Finally at position No. 3 of the beam the target will be driven to potential $V_2$. The indicator and carry over targets are constructed and located so that when they are subject to electron bombardment in one of their regions they will be driven to the potentials which correctly correspond to the binary digits of S (see table of column 6). The polarity of the carry over excitation is reversed with respect to that of the indicator to allow for the fact that the corresponding deflecting plates act on the beam from opposite sides, as previously mentioned.

This method of control of the potential of the target is independent of the beam current, provided that it is sufficient to render ohmic leakages due to imperfect insulation negligible. It will also be shown that the target will assume nearly either one of the two potentials $V_1$ or $V_2$ but not any intermediary potential even if the beam is divided between two regions of the target facing different collectors. Therefore, this method is more suitable to obtain the desired binary signals than the use of the conventional dropping resistance in the target circuit. In the latter case the potential of the target depends in general on the beam current. Furthermore, the numerous resistances required (two per elementary cell) are very undesirable because, if mounted externally, many additional leads have to be sealed through the envelope and, if mounted internally, serious difficulties are encountered in dissipating the power. On the other hand the floating targets can be connected directly to the deflecting plates which they control by short internal connections involving no external or internal parts or welds and no additional seals.

The deflecting plates and the targets are connected as shown diagrammatically on Figure 5. Here the layers of the device are shown side by side rather than one on top of another and the sectors of each layer are spread over about a third of a circle around the cathode rather than the whole circle. The deflecting plates No. 1 of all cells in various layers located on the same vertical lines are connected together (so that they can be made of single metallic plates). These vertical connections are controlled by the multiplicand system of input potentials (the lower digital places are on the right as usual). Plates No. 2 of all cells in a given layer are connected together in a ring and the potentials of these rings are controlled by the multiplier system of input potentials. These two systems of connections form an orthogonal matrix such that every digit of the multiplicand is combined with every digit of the multiplier and vice versa as is required by the arithmetical considerations above. (See for instance the schematic diagram of the arithmetical operations of column 5. In Figure 5, the operations start on the bottom rather than the top as in that diagram.) The carry over targets 9 of one digital position are connected to the carry over deflecting plates No. 4 of the next digital position in the same layer. (Connections from right to left on all layers of Figure 5.) The indicator targets 8 of any digital cell of any layer are connected to the indicator deflector plate No. 3 of the preceding digital cell in the next layer. (Connections 10 running diagonally from bottom left to top right, Figure 5.) This displacement of the connections corresponds to the shift of the subtotal to the right on the above arithmetical diagram (see columns 5 and 6).

Special consideration must be given to the connections of the boundary cells (first and last) and the boundary layers (top and bottom). If each term of the product has $p$ digital places the product will have $2p$ digital places and there will be $p$ subtotal additions each involving $p$ significant digital additions. However $(p+1)$ computing cells are required to perform the $p$ digital additions because the $p$th addition may involve a carry over digit, so that a $(p+1)$th cell is necessary to obtain a carry over signal of the correct polarity. This cell can be eliminated by constructing the carry over target in the $p$th cell so that it gives a signal of reversed polarity with respect to the other carry over targets. However, all the cells may be made exactly alike without taking advantage of this possibility. In this last $(p+1)$th cell all the electrodes but No. 4 are maintained at their non-excited potential $V_1$ and no additional signals may be put on them since this may entail a new carry over digit.

The carry over deflecting plate No. 4 in the first cell of each layer is maintained at its non-excited potential $V_2$. These $p$ deflecting plates could be excited by a system of potentials representing a $p$ place number C (reversed polarity of signals) which would be added to the $2p$ place product $Ax$. Similarly another $p$ place number D can be added to the product $Ax$ using the indicator deflecting plates No. 3 of the first layer of computing cells instead of maintaining them at the potential $V_1$ as would be done if zero were added to the "accepted" or "refused" multiplicand in the first subtotal addition, as explained before.

The addition of a number to the final product is an operation which it is very desirable to incorporate in the electronic computing device because in applications of this tube to anti-aircraft fire control computers, most products have to be added to numbers resulting from previous computations. Unfortunately, the two additions of the numbers C and D are additions of $p$ place numbers which do not contribute to the $p$ highest places of the $2p$ place product. If the device operates with $p$ place numbers in the input, it is significant that the output should have only the $p$ highest places, since there can be no more information in the output than there is in the input when these inputs correspond to physical quantities which are known to a certain given accuracy. Therefore, the additions of the numbers C and D, although feasible without any increase in the number of computing cells, are not of much practical use. A supplementary layer of cells, shown at the top in Figure 5, may be used for the addition of a number B to the significant digital places of the product $Ax$. This number is applied to plates No. 1 of these cells; the last subtotal or product $Ax$ appears on the indicator deflecting plates No. 3 and plates No. 4 are used for carry over purposes as usual. There is therefore the additional possibility of exciting, or not exciting plates No. 2 which are connected in a ring in that layer. This permits one to accept or refuse the number B, i. e. to multiply it by zero or one. The final result, the number $(Ax+B)$ then appears on the indicator targets 8 of the top layer.

With the addition of the $(p+1)$th layer, the multiplication of two $p$ place numbers and the addition of a $p$ place number to the product (or even a $2p$ place number if the digits of B and those of D or C are combined) requires in all $(p+1)^2$ computing cells arranged in $(p+1)$ identical layers each containing $(p+1)$ identical cells. It requires $4p$ leads sealed through the tube envelope to carry the input and output potentials. In Figure 5, $p=4$ for the purpose of illustration so that there are 25 computing cells. In the development of the improved electron tube it was assumed that thirteen place numbers ($p=13$) would be satisfactory. This corresponds to an accuracy in one part in 8192. Relatively minor changes in the design of the device are necessary to increase or decrease the number of digits of the variables, so that a greater accuracy can be easily obtained. An additional digit may be obtained by the simple expedient of constructing special carry over targets for the $p$th cell of each layer as was mentioned above. The device developed comprises thus $14^2=196$ computing cells, and requires $4\times13=52$ leads to carry the information in and out of the tube envelope.

A visual indication of the result $(Ax+B)$ can be obtained, in addition to the electrical indication in terms of the system of potentials on the output leads from the indicator targets of the top layer, by the proper construction of the last layer of computing cells or by a special auxiliary arrangement. In principle it suffices to force the beams of the last layer to strike electrodes which are covered with a fluorescent material when they are in positions corresponding to digits one (or excitation of the indicator targets). This feature is incorporated in the device so that the operation of a complete computer utilizing these tubes may be checked at a glance by setting given numbers in the inputs and verifying arithmetically that all the operations were performed correctly.

The output potentials of the device are at the same D. C. level as the input potentials and they vary by the same amount for a digital change. Therefore it is possible to couple the output of one device directly to the input of another without any coupling elements or amplifiers whatever. For the direct coupling to be really operative the output power (or power available to maintain the output targets at their correct potenial) must be greater than the input power (or power necessary to drive the system of input deflecting plates No. 1 and No. 2 to their proper potentials). This sets certain conditions on the formation of electron beams as will be explained. The possibility of direct coupling between elements of different electronic computing devices is one of the most attractive features of the direct method of computation. It was assumed for all elements of the device.

In conventional electronic devices performing complex operations the complexity resides, in general, in the arrangement of the various impedances which couple simple electronic elements. These are merely "valves" in which the plate current is a function of the grid potential. In the present electronic computing device there are no coupling impedances and the whole complexity is in the tube whose principle of operation is based exclusively on the control of the motion of emitted electrons in vacuum and the action of the bombardment of these electrons on surfaces of targets on which localized field conditions are created by proper electrostatic arrangements. The problem of design is reduced therefore to the conception and development of proper geometrical configurations and potential excitation of electrodes which perform the desired control on the beams and the desired action of the beams on one another. It is a problem of motion of electrons in electrostatic fields or "electron optics."

The actual structure of the device is shown in plan in Fig. 6 and elevation in Fig. 7. The elementary cells 13 are arranged in seven layers 15 to 21, each comprising two groups of fourteen. Each cell occupies one thirtieth of a layer so that there are two blank spaces 22 left to separate the two groups of cells. These spaces are used for connections and mounting purposes. It was found that in this arrangement the cathode emission is utilized more efficiently; the operation is more reliable and the construction simpler than it would have been with the originally contemplated arrangement of fourteen cells in each of fourteen layers. Consecutive layers are separated by three mica sheets B, D, and F, which have holes of various shapes punched in them and serve to mount and insulate the various electrodes. These punched patterns, which are not identical on the three sheets are described below.

The 196 required electron beams are formed by a single structure comprising the cathode 11, two coaxial slotted cylinders 23 and 24 and part of the deflection system. The cathode is an oxide coated nickel tube about .080" in diameter and 4" long. It is surrounded by a coaxial cylinder 23 which is ¾" in diameter and is perforated with rectangular slits arranged in seven bands spaced at ½" intervals, each band comprising two groups of fourteen equidistant slits, .020" wide and .250" long. This cylinder 23 is the first anode and its slits are the beam limiting apertures of the guns. This cylinder is surrounded, in turn, by a second coaxial cylinder 24 of larger diameter (about ⅞") having slits about .040" wide and .300" long radially aligned with those of the first cylinder. This second cylinder 24 creates a field on the edges of the apertures suppressing all secondary emission therefrom. The first anode 23 and suppressor cylinders 24 do not necessarily have to be made by punching seamless tubings. They can be made by forming two flat punched metal sheets into half-cylinders and welding them along long flanges 25 and 26. These flanges are shown in Fig. 6 for the suppressor cylinder. Tabs (not shown) formed on these cylinders are used to mount them to the top and bottom mica sheets. These terminal mica sheets also support the cathode. The remaining beam forming element, the second anode, is formed by No. 7 electrodes which are also part of the deflecting system.

The deflection system of every cell is composed of three "bias" electrodes, maintained at fixed potentials, No. 7, No. 6 and the "fingers" of the front collector, together with four "operating" electrodes No. 1, 2, 3 and 4 whose variable potential assumes one of two values.

There are in all 30 No. 7 electrodes which are bent from sheets of .005" non-magnetic metal (e. g. Nichrome) into L-shapes and which extend the full height of the structure. Their short legs 27 are tangent to a cylindrical surface 1⅜" in diameter coaxial with the cathode, and the spaces between them are in radial register with the slits of the first anode and suppressor cylinders. They form the above-mentioned second anode of the gun structure. The longer legs 28 of the L-shaped No. 7 electrodes are slightly bent and constitute one side of the deflection channels. Each No. 7 electrode serves 7 cells located in a column. Although there are 30 No. 7 electrodes, there are only 28 No. 6 electrodes since the latter is not required in the blank sections. These No. 6 electrodes are the "island" or channel separating electrodes and each one serves 7 cells of a column as do the No. 7 electrodes. The bias plates (No. 6 and No. 7) are held in slits made in the mica separating sheets. Corresponding slits must be made in all three types B, D and F of mica sheets since these electrodes extend the full height of the structure. The remaining bias electrodes are the "fingers" 27 of the front collector and are discussed below.

The connections to electrodes No. 1 and No. 2, corresponding respectively to the multiplicand and multiplier systems of input potentials, form an orthogonal network, as has been mentioned before. Therefore all No. 1 deflectors in the same vertical column of cells are connected together by leads 29 (see Fig. 5) and all No. 2 deflectors in each half layer of 14 cells are connected together by leads 30. The No. 1 electrodes of any column are simply flat plates (about .350" x 4") which are held in slits made in all mica sheets as is done for electrodes No. 6 and No. 7. These plates No. 1 are connected in pairs since there is one column in each of the two groups of cells which corresponds to a given multiplicand digit. The connection 30 of all No. 2 electrodes of one group of fourteen, belonging to the same multiplier digit, forms a semi-circle. The No. 2 electrodes and their semi-circular connection 30 are stamped out of a single sheet of .005" metal, as shown in Fig. 6, section C. This is made possible by the peculiar shape and orientation of the No. 2 electrodes which are composed of two planes forming an angle of about 60°. They are formed by two consecutive bending operations and are, therefore, very rigid. (They are about .060" wide.) The flat connecting parts 30 of the No. 2 electrodes which are in planes C are held between the center micas D and the upper micas B. The upper micas B have triangular openings through which the No. 2 electrodes protrude. The connections from the semi-circular flat rings to the proper leads in the press are brought out of the structure in the blank sections separating the two groups of cells.

The potential of any of the No. 3 or No. 4 electrodes is controlled by the target which is connected to it. Therefore the deflecting plate, connection and target can be formed from a single metal blank. These parts are shown in Figs. 6 and 8. Thus, deflecting plate No. 4 and the carry over target 9 of the preceding cell of the same layer are made of one piece which comprises a flat portion in the plane C and three plane portions perpendicular to that plane (shown by heavy lines on the plan view of Fig. 6). All three portions are bent on the same side of the plane C (the upper side of the plane of paper on the plan of Fig. 6). One portion is the deflecting plate No. 4 and is .500" high whereas the two other plane portions are the section of the targets surrounded by the two different collectors and are only .220" high in order to intercept only about half of the beam in height. These sections of the carry over target are constructed, of course, to obtain the proper control of the deflector to which they are connected. The carry over target and No. 4 deflector piece is held by its flat portion in plane C between the mica sheets B and D in the same manner as the semi-circular connections of the No. 2 electrodes. Appropriate slits are made in mica sheets B to accommodate the three protruding planes of these parts.

The indicator target and deflector No. 3 piece is made in a similar manner. Its flat connecting portion is in a plane E and is held between the micas D and F. It is insulated by the mica D from the flat connecting portion of the carry over target and No. 4 deflector part. The deflector plate No. 3 is bent on one side of the plane D (upward on plan of Fig. 6) and is .500" high, whereas the two sections of the indicator target are bent on the other side (downward on plan of Fig. 6) and are only .220" high. To allow these parts to protrude through the micas, sheets B and D have slits for deflector No. 3 and sheet F has a slit for the target sections. In order to obtain the proper signal, the front section of the target is composed of two parts. One of these has the width of a unit deflection step $s$ (about .030") and is spaced by that distance from the other. These small parts are fairly rugged because they are very short (.220"). The deflecting electrodes No. 3 and No. 4 with their associated targets are preferably formed out of a metal of high secondary electron emissivity, such as an alloy of Mg and Ag.

The collectors 31 and 32 (see Figs. 6 and 9) consist of two stacks of properly punched metal sheets spaced from one another by a distance (about .030") equal to about 12 times their thickness (.0025"). These punchings form laminated collectors somewhat resembling "Venetian blinds." The inner collector punchings have 28 oval holes which surround the front sections of the indicator and carry over targets and 26 narrow and almost radial "fingers" 27 extending towards the inside of the structure. (There are 28 fingers if the wider ones in the blank sections are taken into account.) The tips of the fingers 27 have flaps bent down to form the remaining bias electrodes as shown in Fig. 9. The outer collector has 28 oval holes surrounding the back sections of the indicator and carry over targets. Fifteen laminae are stacked and fastened together for each layer. These stacks are mounted between micas B and F so that the laminae of the inner and outer collectors are in exact register. The collectors of the various layers are connected together by rods 33 extending the full length of the structure which also serve for accurate location with respect to the perforated mica sheets. These rods are shown in Fig. 6. The central lamina of each stack of fifteen has no oval openings for the targets and serves as a shield between the carry over and the indicator target.

The boundary cells of each layer and the boundary layers themselves require special connections, as has been explained. The construction changes which result from these are of a minor character and have been omitted in the present description for the sake of simplicity.

The complete structure of the device thus comprises the following parts:

22 discs of mica 4" in diameter. These include:
    7 with punchings type F
    7 with punchings type B
    6 with punchings type D
    2 with punchings type D and special punchings for supporting cathode, 1st anode and suppressor.

1 cathode .080" in diameter 4" long 1 first anode cylinder .750" in diameter 4" long with 196 slots 1 suppressor cylinder .875" in diameter 4" long with 196 slots 30 L-shaped biasing electrodes No. 7 about .500" x 4"

28 flat biasing electrodes No. 6 (islands) about .160" x 4"

28 flat operating electrodes No. 1 (multiplicand digits) about .300" x 4"

14 half rings each carrying 14 No. 2 electrodes (multiplier digits) about 2.500" in diameter with .500" protruding electrodes 7 stacks of 15 laminations for inner collector (14 with oval holes and one without) about 3.5" in diameter 7 stacks of 15 laminations for outer collector (14 with oval holes and one without) about 4" in diameter 196 pieces No. 3 electrodes and the indicator targets (made out of .005" material about .700" x 1")

196 pieces forming No. 4 electrodes and the carry over targets (made out of .005" material, about .700" x 1")

10 piece rods for the collectors, about .080" by 4' long.

There are altogether 737 parts when the single laminae are counted separately. In practice 15 laminations would be fastened together in advance so that 541 parts remain for the final assembly. This assembly proceeds by successive sub-assemblies of the seven individual layers each comprising about 70 parts. Although the number of parts to be handled is large, the parts themselves are simple and their mounting requires no welding, so that the tube goes "together like a jig saw puzzle" of a known and systematic pattern. The whole construction depends on accurate punching, forming and piercing of parts and requires but a few welds to connect the input and output electrodes to the leads of the press.

Since the device requires some 60 to 70 external connections to its structure, it was necessary to make an envelope with this extremely large number of leads going through a press of some sort. It was found possible to make a glass envelope with 60 leads, but this was not altogether satisfactory.

Figure 11A:
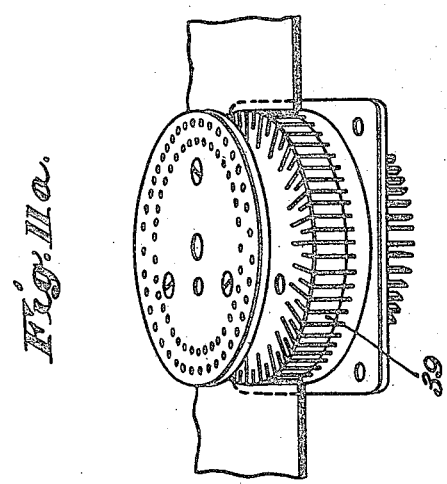
Fig. 11A illustrates a socket suitable for use with the device.
Figure 11:
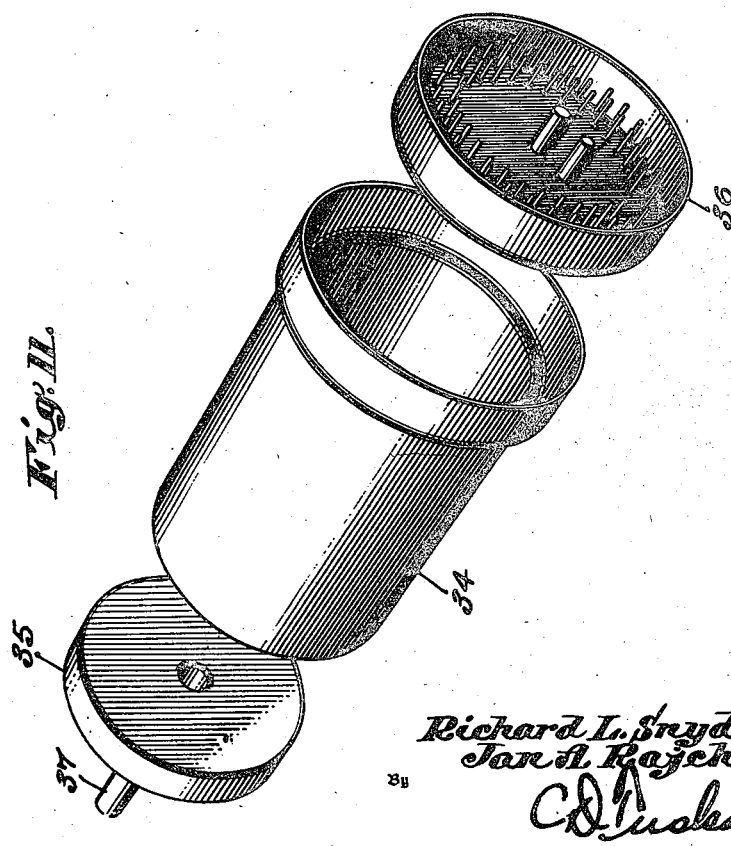

With a view to eliminating these difficulties, a steel envelope was developed in which the leads were brought out by means of Kovar wires passing through glass beads. This envelope (see Figs. 10 and 11) comprised a cylinder 34 about 3½" in diameter and 6" long, with an enlarged skirt at one end, together with two cup-shaped end pieces 35 and 36, one 36 constituting the press and base and the other 35 having the exhaust tube 37 welded into it. In making the press end, the steel plate was first formed into a cup, and then drilled for the leads and locating pins, using a jig. 64 Kovar eyelets, together with the centering and orienting pins, were then copper brazed to the steel plate. Another jig was used to hold the 64 beaded wires in position as accurately as possible, while the glass sleeves were slipped over the eyelets and the seals made. The envelope was assembled by welding and was evacuated and pinched off. An ionization gauge 38, shown still attached in Fig. 10, was used to check the pressure after sealing off. No leakage was detected over a period of three months.

This technique produces a sturdy envelope that could be made into almost any size required by considerations of internal structure size and power dissipation. Its only vulnerable portions are well protected. The skirt formed by the outside cylinder and the bottom cup comes down far enough to protect the press wires from injury, and the pinched off exhaust tube at the top is protected by a dome, through holes in which the windows in the top of the envelope proper (used for visual indication of the output digits) may be provided.

The lead wires of this envelope are sufficiently strong, well protected, and accurately spaced to permit their being used as base pins, and plugged directly into a socket, provided the contacts of the latter are not too inflexible. A 64-contact socket 39 was designed and built to meet this requirement (see Fig. 11). The contacts were free to move a little both radially and tangentially, and to rotate very slightly in their oversized radial slots; and would thus accommodate themselves to any slight variations in alignment of the press wires without throwing appreciable strain on the glass seals. The combination of holes and slots used in holding the socket contacts, together with proper shape and tension of the contact springs, permitted insertion and withdrawal of the tube without undue force, and insured good contacts on all 64 pins.

The electronic calculating device may be operated with the following potentials:

| | Volts |
|---|---|
| Cathode | 0 |
| First anode | +400 |
| Suppressor cylinder | 310 |
| No. 7 | 740 |
| No. 6 | 790 |
| Inner collector | 700 |
| Outer collector | 600 |
| Input to No. 1 and No. 2 | 600 or 700 |

The first anode 23 creates an essentially radial field around the cathode. Therefore, the electrons emanate radially and about 88 per cent of them are stopped by the first anode while 12 per cent pass through the slots which are the apertures of the system. The bundles of electrons thus formed are focused on the targets by lenses existing between the short legs 27 of No. 7 electrodes. The auxiliary cylinder or suppressor 24 with larger slots which surrounds the first anode 23 suppresses the secondary emission from the edges of the apertures of the first cylinder. The total cathode emission is about 600 ma. and it is space-charge limited so that it depends only upon the geometry and potentials of the cathode and anode. This emission is divided into about 530 ma. to the first anode and 70 ma. which is the useful current in the beams. (About 360 microamperes per beam.) The anode power dissipated in the tube is therefore about 260 watts and the cathode power necessary to obtain the space-charge limited emission is 10 to 15 watts.

The two potentials which are assumed by the targets 8 and 9 and the operating electrodes 1, 2, 3 and 4 of the tube are respectively 600 to 700 volts positive with respect to the cathode, making the "operating unit step of potential" equal to 100 volts. Therefore, No. 7 electrode, at 740 volts, is always positive with respect to electrode No. 1 and there is a constant field which produces a permanent deflection of the beam toward No. 7 electrode. In this manner any evaporation from the cathode which is propagated in straight paths does not reach the targets and consequently does not spoil their secondary emissivity. Furthermore, this constant field causes most of the stray currents to be collected by the fixed potential No. 7 electrode rather than by the operating electrode No. 1 and thereby reduces the detrimental effects of these currents.

The island electrodes No. 6 at 790 volts produce, together with electrodes No. 7 and the fingers of the inner collector 32, constant "biasing" field conditions, such that the beam passes through the excluded or coincident channels according to the potential of No. 1 electrode, without changing its striking point on the targets. Furthermore, the deflections due to a unit voltage variation on any one of the electrodes No. 3, No. 4 and No. 2 (when No. 1 is excited) are just one unit deflection step regardless of the state of excitation of the others. Therefore, for any one of the 16 possible combinations of the excitations of deflecting plates No. 1, No. 2, No. 3 and No. 4 in each cell, the beam strikes the target at one of the four possible correct positions.

The field created on the surface of the target sections depends wholly upon the potential of the collectors because the influence of the potential of all other electrodes is shielded therefrom by the fairly deep and closely spaced portions of the laminations which surround them. This good shielding is obtained at the expense of a small loss of primary current of about 7 per cent. Therefore, each target, which is bombarded by about 120 microamperes (since the 360 microamperes of each beam are divided between the carry over and the indicator targets as well as that wasted in the space between the targets and on the laminations), actually assumes the potential of the collector which surrounds the bombarded region. For that reason these collectors are maintained respectively at 600 and 700 volts. It was chosen to set the inner collector at 700 volts and the outer at 600 volts although the opposite could have been done as well provided that the targets had the proper complementary shapes.

As stated above, the targets will assume one or the other of the two collector potentials but not an intermediate potential even when the current of the beam is divided between the two regions of the target. This remarkable property has been observed in all arrangements in which the field of each of two regions of the target was solely determined by the potential of the corresponding collector. A more detailed description of this effect may be of interest.

This property may be explained with the help of Figure 12, which shows the current I to a secondary emissive target as a function of its potential V. The primary current has been plotted as positive and the secondary current as negative, and the secondary emission ratio is taken equal to two in the potential range shown in the diagram. Curve A shows the net current to the target when it is wholly bombarded in the region of collector No. 1 maintained at the potential $V_1$ and curve B when it is bombarded in the region of collector No. 2. It is apparent that a floating target will assume the potential $V_3$ in the first case and the potential $V_4$ in the second, since the current to the target must be zero at the equilibrium potentials. These equilibrium potentials $V_3$ and $V_4$ are slightly positive with respect to the collector potentials $V_1$ and $V_2$ because the initial velocities of the secondary electrons are sufficient to overcome a slight negative field. Let us assume now that ¾ of the current strikes the target in the region controlled by collector No. 1 and ¼ in the region controlled by collector No. 2. The currents to these regions are represented by the dotted lines $a$ and $b$, which are scale reductions of the curves A and B. The total current to the target is represented by curve $t$ which is obtained by adding the ordinates of curves $a$ and $b$. It is apparent that in that condition a floating target will assume the potential $V_5$, which is approximately equal to $V_1$. If the proportions of the currents were reversed and there was more current striking collector No. 2, the floating target would assume a potential $V_6$ about equal to $V_2$. Therefore, it is seen that a floating target will always assume approximately the potential of the collector controlling the region to which most of the current is going.

It is obvious that the stability of the equilibrium potential depends upon the rate of change of the current to the target with respect to its potential in the equilibrium potential region. The steepness of the curves in this region depends upon the distribution of initial velocities of the secondary electrons, on the secondary emission ratio, and on the magnitude of the current in the beam. It is therefore desirable to operate with high beam intensities and to utilize materials with high secondary emissivity. Furthermore, it will be noticed that a division of the beam current between the two regions of the target causes a flattening of the curve in the region of the potential equilibrium $V_5$. The steepness becomes smaller when the division is more nearly even and becomes theoretically zero when the current of the beam is divided into two exactly equal halves. Therefore, from the standpoint of stability, it is desirable to operate with the beam current divided as unevenly as possible, as might well be expected.

The electronic computing device was conceived as one of the main elements of an all-electronic numerical computer for anti-aircraft fire control. Its purpose is to add and multiply with absolute accuracy large numbers given in terms of systems of potentials by a direct method, which is extremely fast because it involves no definite succession of operations. Its principle is based exclusively on electron optical properties and depends upon intricate interactions of a multiplicity of electron beams on one another rather than on conventional impedance couplings between simple electronic tubes. Therefore, it is novel in two essential respects: the method of computation and the particular means chosen to perform it.

We claim as our invention:

1. A calculating device including electron producing means, means for forming said electrons into a beam, a target provided with areas spaced lengthwise of said beam and capable of secondary electron emission, a plurality of secondary electron collecting means each maintained at a different potential and each arranged to collect electrons from a different one of said areas, and means for deflecting said beam from one to another of said areas in response to potentials representing different numbers.

2. In the operation of a device including an electron gun and a floating target provided with secondary electron emissive areas, the method of commutating the potential of said target from one predetermined value to another which includes presenting to one of said areas an electrode maintained at one potential presenting to another of said areas an electrode maintained at a different potential gradient, and moving the beam of said gun from one to another of said surfaces.

3. In the operation of a device including an electron gun and a floating target provided with secondary electron emissive areas, the method of commutating the potential of said target from one predetermined value to another which includes presenting to one of said areas an electrode maintained at one potential presenting to another of said areas an electrode maintained at a different potential, and moving said beam from one to another of said surfaces in response to potentials representing digits of different numbers.

4. In the operation of a device including an electron gun and a floating target provided with secondary electron emissive areas spaced lengthwise of the beam of said gun, the method of commutating the potential of said target from one predetermined value to another which includes collecting the secondary electrons from one of said areas at one predetermined potential, collecting the secondary electrons from another of said areas at a different predetermined potential, and moving said beam from one to another of said areas.

5. The combination of electron producing means, means for forming said electrons into a beam, a floating target having secondary electron emissive surfaces spaced from one another, means maintained at one potential for collecting secondary electrons from one of said surfaces, means maintained at a different potential for collecting secondary electrons from another of said surfaces, and means comprising a constant potential electrode and an electrode responsive to different potentials for directing said beam to one of said areas through different paths.

6. The combination of electron producing means, means for forming said electrons into a beam, a floating target having secondary electron emissive surfaces spaced from one another, means maintained at one potential for collecting secondary electrons from one of said surfaces, means maintained at a different potential for collecting secondary electrons from another of said surfaces, means comprising a constant potential electrode and an electrode responsive to different potentials for directing said beam to one of said areas through different paths, and a target area selecting electrode responsive to different potentials for moving said beam from one to another of said areas.

7. The combination of electron producing means, means for forming said electrons into a beam, a floating target having secondary electron emissive surfaces spaced from one another, means for collecting secondary electrons from one of said surfaces at one potential and from another of said surfaces at a different potential, and means comprising a constant potential electrode and an electrode responsive to different potentials for directing said beam to one of said areas through different paths, and a plurality of target selecting electrodes each responsive to different potentials for moving said beam to different positions on said areas.

8. A calculating device including electron producing means, means for forming said electrons into a beam, a pair of floating targets spaced from one another transversely of said beam and each provided with secondary electron emissive surfaces spaced from one another lengthwise of said beam, means for shielding said targets from one another, and means for moving said beam simultaneously to positions correspondingly spaced along said targets transversely of said beams.

9. A calculating device including electron producing means, means for forming said electrons into a beam, a pair of floating targets spaced from one another transversely of said beam and each provided with secondary electron emissive surfaces spaced from one another lengthwise of said beam, means for shielding said targets from one another, means for moving said beam simultaneously to positions correspondingly spaced along said targets transversely of said beams, and means for deriving from said targets potentials dependent on the position of said beam.

10. A calculating device including electron producing means, means for forming said electrons into a beam, a pair of floating targets spaced from one another transversely of said beam and each provided with secondary electron emissive surfaces spaced from one another lengthwise of said beam, means for shielding said targets from one another, means for moving said beam simultaneously to positions correspondingly spaced along said targets transversely of said beams, and means for deriving from said targets potentials which are the same for certain positions of said beam and are different for other positions of said beam.

11. The combination of electron producing means, means for forming said electrons into a beam, subtotal and carry over targets shielded from one another and each having secondary electron emissive surfaces which are more remotely and less remotely spaced from said electron producing means and are provided with operating positions so aligned that said beam strikes the more remote subtotal target surface and the less remote carry over target surface in the first of said positions, strikes the less remote surfaces of said targets in the second of said positions, strikes the more remote surfaces of said targets in the third of said positions and strikes the less remote subtotal target surface and the more remote carry over target surface in the fourth of said positions, means maintained at one potential for collecting secondary electrons from said more remote surfaces, and means maintained at another potential for collecting secondary electrons from said less remote surfaces.

12. The combination of electron producing means, means for forming said electrons into a beam, subtotal and carry over targets shielded from one another and each having secondary electron emissive surfaces which are more remotely and less remotely spaced from said electron producing means and are provided with operating positions so aligned that said beam strikes the more remote subtotal target surface and the less remote carry over target surface in the first of said positions, strikes the less remote surfaces of said targets in the second of said positions, strikes the more remote surfaces of said targets in the third of said positions and strikes the less remote subtotal target surface and the more remote carry over target surface in the fourth of said positions, and a plurality of electrodes energizable to different potentials for moving said beam from one to another of said positions.

13. The combination of electron producing means, means for forming said electrons into a beam, subtotal and carry over targets shielded from one another and each having secondary electron emissive surfaces which are more remotely and less remotely spaced from said electron producing means and are provided with operating positions so aligned that said beam strikes the more remote subtotal target surface and the less remote carry over target surface in the first of said positions, strikes the less remote surfaces of said targets in the second of said positions, strikes the more remote surfaces of said targets in the third of said positions and strikes the less remote subtotal target surface and the more remote carry over target surface in the fourth of said positions, and a plurality of electrodes arranged at successive points along said beam and each energizable to two different potentials for moving said beam from one to another of said positions.

14. The combination of electron producing means, means for forming said electrons into a beam, subtotal and carry over targets shielded from one another and each having secondary electron emissive surfaces which are more remotely and less remotely spaced from said electron producing means and are provided with operating positions so aligned that said beam strikes the more remote subtotal target surface and the less remote carry over target surface in the first of said positions, strikes the less remote surfaces of said targets in the second of said positions, strikes the more remote surfaces of said targets in the third of said positions and strikes the less remote subtotal target surface and the more remote carry over target surface in the fourth of said positions, and means including a shielding electrode and an electrode energizable to two different potentials for directing said beam through different paths to one of said positions.

15. The combination of electron producing means, means for forming said electrons into a beam, a target provided with secondary electron emissive areas spaced from one another and each surrounded by a separate spaced-lamination shield maintained at a different potential, and means including electrodes subjected respectively to potentials representing digits of different numbers for deflecting said beam from one to another of said areas.

16. The combination of electron producing means, means for forming said electrons into a plurality of separate beams, a subtotal target and a carry over target disposed in the path of each beam and each having secondary electron emissive surfaces which are more remotely and less remotely spaced from said electron producing means, means maintained at one potential for collecting secondary electrons from said more remote surfaces, means maintained at another potential for collecting secondary electrons from said less remote potential surfaces, and means for deflecting each of said beams from one to another surface of its corresponding subtotal and carry over targets.

17. The combination of electron producing means, means for forming said electrons into a plurality of separate beams, a subtotal target and a carry over target disposed in the path of each beam and each having secondary electron emissive surfaces which are more remotely and less remotely spaced from said electron producing means, means maintained at one potential for collecting secondary electrons from said more remote surfaces, means maintained at another potential for collecting secondary electrons from said less remote potential surfaces, means for deflecting each of said beams, and means energizable to the subtotal target potential of one of said beams for controlling the deflection of another of said beams.

18. The combination of electron producing means, means for forming said electrons into a plurality of separate beams, a subtotal target and a carry over target disposed in the path of each beam and each having secondary electron emissive surfaces which are more remotely and less remotely spaced from said electron producing means, means maintained at one potential for collecting secondary electrons from said more remote surfaces, means maintained at another potential for collecting secondary electrons from said less remote surfaces, and means energizable to potentials representing the digits of a multiplicand and a multiplier for deflecting each of said beams from one to another surface of its corresponding subtotal and carry over targets.

19. The combination of electron producing means, means for forming said electrons into a plurality of separate beams, a subtotal target and a carry over target disposed in the path of each beam and each having secondary electron emissive surfaces which are more remotely and less remotely spaced from said electron producing means, means maintained at one potential for collecting secondary electrons from said more remote surfaces, means maintained at another potential for collecting secondary electrons from said less remote surfaces, means energizable to potentials representing the digits of a multiplicand and a multiplier for deflecting each of said beams from one to another surface of its corresponding subtotal and carry over targets, and means for modifying said deflection in response to the subtotal and carry over target potential of other of said beams.

20. The combination of electron producing means, means including an apertured member surrounding said electron producing means for producing a plurality of electron beams angularly disposed about the axis of said electron producing means, a subtotal target and a carry over target disposed in the path of each beam and each having secondary electron emissive surfaces which are more remotely and less remotely spaced from said electron producing means, a plurality of means maintained at different potentials for collecting electrons respectively from said more remote surfaces and from said less remote surfaces, and means for deflecting each beam from one to another surface of its corresponding subtotal and carry over targets.

21. The combination of electron producing means, means including an apertured member surrounding said electron producing means for producing a plurality of electron beams angularly disposed about the axis of said electron producing means, a subtotal target and a carry over target disposed in the path of each beam and each having secondary electron emissive surfaces which are more remotely and less remotely spaced from said electron producing means, a plurality of means maintained at different potentials for collecting electrons respectively from said more remote surfaces and from said less remote surfaces, means for deflecting each beam from one to another surface of its corresponding subtotal and carry over targets, and means energizable to the carry over target potential of one of said beams for modifying the deflection of another of said beams.

22. The combination of electron producing means, means including an apertured member surrounding said electron producing means for producing a plurality of electron beams angularly disposed about the axis of said electron producing means, a subtotal target and a carry over target disposed in the path of each beam and each having secondary electron emissive surfaces which are more remotely and less remotely spaced from said electron producing means, different means maintained at different potentials for collecting electrons respectively from said more remote surfaces and from said less remote surfaces, means energizable to potentials representing respectively digits of a multiplicand and a multiplier for deflecting each beam from one to another surface of its corresponding subtotal and carry over targets, and means energizable to the carry over target potential of one of said beams for modifying the deflection of another of said beams.

23. The combination of electron producing means, means including an apertured member surrounding said electron producing means for producing a plurality of electron beams angularly disposed about the axis of said electron producing means, a subtotal target and a carry over target disposed in the path of each beam and each having secondary electron emissive surfaces which are more remotely and less remotely spaced from said electron producing means, means maintained at one potential for collecting secondary electrons from said more remote surfaces, means maintained at another potential for collecting secondary electrons from said less remote surfaces, means energizable to a potential representing a digit of one number for deflecting the path of said beams, and means each energizable to a potential representing a different digit of another number for modifying said deflection.

24. The combination of electron producing means, means including an apertured member surrounding said electron producing means for producing a plurality of electron beams angularly disposed about the axis of said electron producing means, a subtotal target and a carry over target disposed in the path of each beam and each having secondary electron emissive surfaces which are more remotely and less remotely spaced from said electron producing means, means maintained at different potentials for collecting electrons from said more remote and less remote surfaces, means energizable to a potential representing a digit of one number for deflecting the path of said beams, means each energizable to a potential representing a different digit of another number for modifying said deflection, and means energizable to the carry over target potential of said beams for modifying the deflection of the beam corresponding to the next higher digit of said other number.

25. The combination of a cathode, an anode arranged to form a plurality of electron beams located in layers each including a plurality of said beams similarly disposed about the axis of said cathode, subtotal and carry over targets disposed in the path of each beam and each having secondary electron emissive surfaces which are more and less remotely spaced from said cathode, means maintained at different potentials for collecting secondary electrons from said differently spaced surfaces, a multiplicand electrode associated with each beam for deflecting said beam, the multiplicand electrodes of the similarly disposed beams of said layers being electrically integral, a multiplier electrode associated with each beam for modifying the deflection of said beam, and means interconnecting the multiplier electrodes in each beam layer.

26. The combination of a cathode, an anode arranged to form a plurality of electron beams located in layers each including a plurality of said beams similarly disposed about the axis of said cathode, subtotal and carry over targets disposed in the path of each beam and each having secondary electron emissive surfaces which are more and less remotely spaced from said cathode, means maintained at different potentials for collecting secondary electrons from said differently spaced surfaces, a multiplicand electrode associated with each beam for deflecting said beam, the multiplicand electrodes of the similarly disposed beams of said layers being electrically integral, a multiplier electrode associated with each beam for modifying the deflection of said beam, means interconnecting the multiplier electrodes in each beam layer, and means energizable to the carry over target potentials of the beams in each layer for modifying the deflection of other beams in the same layer.

27. The combination of a cathode, an anode arranged to form a plurality of electron beams located in layers each including a plurality of said beams similarly disposed about the axis of said cathode, subtotal and carry over targets disposed in the path of each beam and each having secondary electron emissive surfaces which are more and less remotely spaced from said cathode, means maintained at different potentials for collecting secondary electrons from said differently spaced surfaces, a multiplicand electrode associated with each beam for deflecting said beam, the multiplicand electrodes of the similarly disposed beams of said layers being electrically integral, a multiplier electrode associated with each beam for modifying the deflection of said beam, means interconnecting the multiplier electrodes in each beam layer, means energizable to the carry over target potentials of the beams in each layer for modifying the deflection of other beams in the same layer, and means energizable to the subtotal target potentials of the beams in each layer for modifying the deflection of the beam in another layer.

28. The combination of a cathode, an anode arranged to form a plurality of electron beams located in layers each including a plurality of said beams similarly disposed about the axis of said cathode, subtotal and carry over targets disposed in the path of each beam and each having secondary electron emissive surfaces which are more and less remotely spaced from said cathode, means maintained at different potentials for collecting secondary electrons from said differently spaced surfaces, a multiplicand electrode associated with each beam for deflecting said beam, the multiplicand electrodes of the similarly disposed beams of said layers being electrically integral, a multiplier electrode associated with each beam for modifying the deflection of said beam, means for applying to each of said interconnected multiplicand electrodes a potential representing a different digit of one number, means for applying to each of interconnected multiplier electrodes a potential representing a different digit of another number, and means for deriving potentials representing the different digits of the product of said numbers from the different subtotal targets of one of said interconnected multiplier electrode beam groups.

29. The combination of a cathode, an anode arranged to form a plurality of electron beams located in layers each including a plurality of said beams similarly disposed about the axis of said cathode, subtotal and carry over targets disposed in the path of each beam and each having secondary electron emissive surfaces which are more and less remotely spaced from said cathode, means maintained at different potentials for collecting secondary electrons from said differently spaced surfaces, a multiplicand electrode associated with each beam for deflecting said beam, the multiplicand electrodes of the similarly disposed beams of said layers being electrically integral, a multiplier electrode associated with each beam for modifying the deflection of said beam, means interconnecting the multiplier electrodes in each beam layer, means for applying to each of said interconnected multiplicand electrodes a potential representing a different digit of one number, means for applying to each of interconnected multiplier electrodes a potential representing a different digit of another number, means for deriving potentials representing the different digits of the product of said numbers from the different subtotal targets of one of said interconnected multiplier electrode beam groups, and a similar additional layer of beam forming and control units whereby a number may be added to said product.

30. The combination of a cathode, an anode arranged to form a plurality of electron beams located in layers each including a plurality of said beams similarly disposed about the axis of said cathode, subtotal and carry over targets disposed in the path of each beam and each having secondary electron emissive surfaces which are more and less remotely spaced from said cathode, means maintained at different potentials for collecting secondary electrons from said differently spaced surfaces, a multiplicand electrode associated with each beam for deflecting said beam, the multiplicand electrodes of the similarly disposed beams of said layers being electrically integral, a multiplier electrode associated with each beam for modifying the deflection of said beam, means interconnecting the multiplier electrodes in each beam layer, means for applying to each of said interconnected multiplicand electrodes a potential representing a different digit of one number, means for applying to each of interconnected multiplier electrodes a potential representing a different digit of another number, means for deriving potentials representing the different digits of the product of said numbers from the different subtotal targets of one of said interconnected multiplier electrode beam groups, a similar additional layer of beam forming and control units whereby a number may be added to said product, and means for deriving from the subtotal targets of said additional beam layer potentials representing the digits of the result of said addition.

31. The combination of a plurality of electron guns arranged in layers each including a group of similarly disposed guns, each of said guns being provided with subtotal and carry over targets each having secondary electron emissive areas spaced apart along an electron beam path and with multiplicand, multiplier, subtotal and carry over beam deflectors, the multiplicand deflectors of the guns similarly disposed in the different layers being electrically integral, and means interconnecting the multiplier deflectors in the same layer.

32. The combination of a plurality of electron guns arranged in layers each including a group of similarly disposed guns, each of said guns being provided with subtotal and carry over targets each having secondary electron emissive areas spaced apart along an electron beam path and with multiplicand, multiplier, subtotal and carry over beam deflectors, the multiplicand deflectors of the guns similarly disposed in the different layers being electrically integral, means interconnecting the multiplier deflectors in the same layer, means for applying to the successive interconnected multiplicand deflector groups potentials representing the successive digits of multiplicand, and means for applying to the successive interconnected multiplier deflector groups potentials representing the successive digits of multiplier.

33. The combination of a plurality of electron guns arranged in layers each including a group of similarly disposed guns, each of said guns being provided with subtotal and carry over targets each having secondary electron emissive areas spaced apart along an electron beam path and with multiplicand, multiplier, subtotal and carry over beam deflectors, the multiplicand deflectors of the guns similarly disposed in the different layers being electrically integral, means interconnecting the multiplier deflectors in the same layer, means for applying to the successive interconnected multiplicand deflector groups potentials representing the successive digits of multiplicand, means for applying to the successive interconnected multiplier deflector groups potentials representing the successive digits of multiplier, all but one of said carry over deflectors located in the same gun layer being electrically integral with the carry over target of a gun having its multiplicand deflector subjected to a potential representing the next lowest digit of said multiplicand.

34. The combination of a plurality of electron guns arranged in layers each including a group of similarly disposed guns, each of said guns being associated with subtotal and carry over targets each having secondary electron emissive areas spaced apart along an electron beam path and with multiplicand, multiplier, subtotal and carry over beam deflectors, the multiplicand deflectors of the guns similarly disposed in the different layers being electrically integral, means interconnecting the multiplier deflectors in the same layer, means for applying to the successive interconnected multiplicand deflector groups potentials representing the successive digits of multiplicand, means for applying to the successive interconnected multiplier deflector groups potentials representing the successive digits of multiplier, all but one of the subtotal deflectors of said beam layer being electrically integral with the subtotal target of a gun having its multiplicand deflector subjected to a potential representing the next highest digit of said multiplicand and its multiplier deflector subjected to a potential representing the next lowest digit of said multiplier.

35. The method of commutating the potential of a target having spaced secondary electron emissive surfaces from one value to another which method includes moving an electron beam from one to another of said surfaces, collecting secondary electrons from one of said surfaces at one potential, and collecting secondary electrons from another of said surfaces at another potential.

36. The combination of electron producing means, a floating target having secondary electron emissive surfaces spaced from one another, and means including secondary electron collectors maintained at different potentials for establishing at one of said surfaces an electrostatic field which is dependent on the potential of said target and one of said collectors and for establishing at another of said surfaces an electrostatic field which is dependent on the potential of said target and another of said collectors.

RICHARD L. SNYDER, JR.
JAN A. RAJCHMAN.

REFERENCES CITED

The following references are of record in the file of this patent:

UNITED STATES PATENTS

| Number | Name | Date |
|---|---|---|
| 1,920,863 | Hopkin, Jr. | Aug. 1, 1933 |
| 2,053,268 | Davis | Sept. 8, 1936 |
| 2,103,507 | Zworykin | Dec. 28, 1937 |
| 2,185,693 | Mertz | Jan. 2, 1940 |
| 2,210,034 | Keyston | Aug. 6, 1940 |
| 2,250,527 | Gray | July 29, 1941 |
| 2,305,646 | Thomas | Dec. 22, 1942 |
| 2,283,383 | McNaney | May 19, 1942 |
| 2,200,063 | Heising | May 7, 1940 |
| 1,903,569 | Jarvis et al. | Apr. 11, 1933 |
| 2,321,912 | Hedberg | June 15, 1943 |
| 2,271,716 | Salzberg | Feb. 3, 1942 |
| 2,264,269 | Banks | Dec. 2, 1941 |
| 2,188,410 | Linsell | Jan. 30, 1940 |

FOREIGN PATENTS

| Number | Country | Date |
|---|---|---|
| 505,557 | Great Britain | May 8, 1939 |